(12) United States Patent
Burger et al.

(10) Patent No.: US 9,820,474 B2
(45) Date of Patent: Nov. 21, 2017

(54) SYSTEMS AND METHODS FOR ELECTRIFIED FISH BARRIERS

(71) Applicant: Smith-Root, Inc, Vancouver, WA (US)

(72) Inventors: Carl Burger, Vancouver, WA (US); Jeffery Smith, Vancouver, WA (US)

(73) Assignee: SMITH-ROOT, INC., Vancouver, WA (US)

( * ) Notice: Subject to any disclaimer, the term of this patent is extended or adjusted under 35 U.S.C. 154(b) by 287 days.

(21) Appl. No.: 14/602,930

(22) Filed: Jan. 22, 2015

(65) Prior Publication Data

US 2015/0196012 A1   Jul. 16, 2015

Related U.S. Application Data

(62) Division of application No. 12/716,868, filed on Mar. 3, 2010, now abandoned.

(51) Int. Cl.
| | | |
|---|---|---|
| *A01K 79/02* | (2006.01) | |
| *A01K 61/00* | (2017.01) | |
| *E02B 1/00* | (2006.01) | |

(52) U.S. Cl.
CPC .............. *A01K 61/00* (2013.01); *A01K 79/02* (2013.01); *E02B 1/006* (2013.01)

(58) Field of Classification Search
CPC ........ A01K 79/00; A01K 79/02; A01K 61/00; E02B 1/006
See application file for complete search history.

(56) References Cited

U.S. PATENT DOCUMENTS

| | | | | | |
|---|---|---|---|---|---|
| 5,307,052 | A | * | 4/1994 | Harrison | G01N 33/186 119/215 |
| 5,327,854 | A | * | 7/1994 | Smith | A01K 79/02 119/220 |
| 5,448,968 | A | * | 9/1995 | Ostlie | A01K 79/02 119/220 |
| 6,471,576 | B1 | * | 10/2002 | Ross | A22B 3/06 452/58 |
| 7,753,836 | B2 | * | 7/2010 | Peterchev | A61N 2/006 600/14 |

OTHER PUBLICATIONS

WO 2008/046116—Becker et al., Apr. 2008.*

* cited by examiner

*Primary Examiner* — Thanh Pham
(74) *Attorney, Agent, or Firm* — Law Offices of J. Curtis Edmonson; J. Curtis Edmondson; Anitha Shamkarnarayan

(57) ABSTRACT

The inventive subject matter describes an electrical barrier for the deterrence of fish having an electrical barrier with a computer system capable of executing a modified soft-start algorithm, the computer system further having a detector input and a switch output; a bio-electric fish proximity detector, the bio-electric fish proximity detector having a anode-cathode detecting pair input and a signal output, wherein said signal output is connected to the detector input; a time varying voltage source.

7 Claims, 14 Drawing Sheets

SYSTEMS AND METHODS FOR ELECTRIFIED FISH BARRIERS

RELATED APPLICATIONS

This application is a divisional of application Ser. No. 12/716,868 filed Mar. 3, 2010. This application claims the benefit of U.S. Provisional Application No. 61/157,803, filed Mar. 5, 2009, the contents herein incorporated into this application by reference

BACKGROUND

The present inventive subject matter relates to the use of electric fields to guide fish and other aquatic animals and to prevent injury thereof.

The effect of electric currents on fish are well known in the prior art of electrofishing. Electrofishing involves the use of electric currents to attract and/or repel fish with the intent of creating aquatic barriers and/or to improve sample yields during fish conservation activities.

Electrofishing has traditionally been used in freshwater lakes and streams and is the subject of U.S. Pat. Nos. 5,327,854; 4,750,451; 4,672,967; 4,713,315; 5,111,379; 5,233,782; 5,270,912; 5,305,711; 5,311,694; 5,327,668; 5,341,764; 5,551,377; and 6,978,734 which are incorporated herein by reference. Also, electrofishing has been the used to stimulate yields of trawl net fishing as described in U.S. Pat. Nos. 3,110,978 and 4,417,301 which are also incorporated herein by reference.

It is well known in the prior art that relatively small potentials impressed across the body of a fish invoke a flight reaction. Larger potentials result in the alignment of the fish with the electric current. Still larger potentials may result in electronarcosis and/or the complete euthanasia of the fish. (See Introduction to Electrofishing, pages 24-26, Smith-Root, Inc. which is incorporated herein by reference).

As a consequence of the well-established physiological reaction of fish to electric currents, it is possible to construct "electric barriers" in water that are designed to deter fish. The underwater electric barrier can be thought of as the above ground analog of the electric fence commonly used to constrain livestock in a field. Although the above ground analogy to underwater barriers is easy to conceptualize, the fact that water is a conductive media creates a number of additional technical considerations in the construction of electrified barriers. For example, the placement of electrodes, cost of power consumption, and the potential harm to endangered species are all considerations for underwater barriers that are generally not found in above ground electric barriers.

Despite the inherent technical challenges posed by underwater barriers, underwater electric barrier technology for fish entrainment has been used in a number of locations both nationally and internationally. Representative examples of such barrier systems that are used to guide fish. Representative barriers are manufactured by Smith-Root, Inc. are located at the Granite Reef Dam, on the Salt River (Arizona, U.S.A.), the Chicago Sanitary and Ship Canal (Illinois, U.S.A.), and Eagle Creek National Fish Hatchery (Oregon, U.S.A.). Exemplary barrier systems are also illustrated in U.S. Pat. No. 5,445,111 (Aug. 29, 1995) issued to David Smith which is incorporated herein by reference.

Despite the wide diversity of geographic places in which these barrier systems are deployed they operate in a similar manner. These systems typically consist of a: 1) a pulsator unit, 2) an electrode array, and 3) a mechanical structure in which the electrode array is attached (e.g. electrode array support structure). (See Prior Art FIG. 1). The pulsator unit provides the electrical potential in either AC, DC, and/or Pulsed DC waveforms. The electrode array is immersed in the water and the electrode array support structure fixes the electrodes in a predetermined spaced array. When the pulsator unit energizes the electrode array, an electric field is created in and around the spaced array of fixed electrodes. The potential field can be calculated based on the electric potential of the pulsator and the location of each electrode in the spaced array.

In a typical configuration for a barrier operation the pulsator is designed to generate electric fields at all times. This basis for this continuous operation is to insure that fish are repelled, by the barrier at any time. As previously discussed, these electric fields may be AC, DC, and/or pulsed DC. Unfortunately, the continuous operation of the electrical barrier results in higher operational costs due to energy costs and increased maintenance.

For example, a continuously operating barrier will draw electricity continuously even if no fish are present. This may be inefficient during periods of time where there is no passage of fish. Furthermore, all electrodes experience degradation as a consequence of the electrolytic action of the electrode with the water. Therefore a continuously operating barrier will cause maximum amount of electrolytic action of the electrodes and consequently, increased degradation of the electrodes.

Also, it is not uncommon for electrical fish barriers to be turned on and off for maintenance purposes. Likewise, there may be situations where electrical fish barriers may be turned off in response to certain situations, for example, in the presence of a non-target object or organism.

One of the problems of electrical fish barrier "turn-on" and/or pulsator initiation, is the undesired side effect that may occur for certain bottom dwelling species of fish (e.g., sturgeon) that may be located near the electrode array or perhaps nestled against an electrode. The application of an operational voltage by the pulsator to electrode array may result in immediate electrotaxis and/or physiological damage to the fish due to an electrically induced convulsive response. Some of these fish are commercially valuable and thus any damage due to the effects of the electrical barrier being energized may diminish their potential catch value.

Therefore, in an effort to ameliorate the effect of a large electrical potential being applied to a fish barrier, what is desired is an apparatus and method to slowly "ramp up" the electrical field with a goal to minimize the damage caused by existing pulsators or barrier systems on benthic species.

SUMMARY

The present inventive subject matter overcomes problems in the prior art by providing an electrical barrier for the deterrence of fish having a soft start pulsator unit; the soft start pulsator unit having a anode and a cathode, the anode and cathode capable of generating an energy increasing electrical field; an electrode array, the electrode array electrically connected to the soft start pulsator unit; wherein the electrode array has a plurality of anode leads and a plurality of cathode leads, the anode leads electrically connected to the anode leads and the cathode leads connected to the cathode; a support structure, the support structure mechanically connected to the electrode array, such that the anode leads and the cathode leads are separated and generate the energy increasing electrical field when the anode leads and the cathode leads are immersed in water; such that when the energy increasing electrical field is generated between the anode leads and the cathode leads so that fish will be deterred by the electrical barrier. The electrical barrier for the deterrence of fish further has an energy increasing field further having a constant current source; a time varying voltage source, the time varying voltage source increasing from a minimum potential to a maximum potential; such that the product of the constant current source and the time varying voltage source will transfer increasing amounts of energy to the fish thereby evoking a flight response. The electrical barrier for the deterrence of fish further has a time varying voltage source with a sine-like waveform. The electrical barrier for the deterrence of fish having a time varying voltage source further has a triangle-like waveform.

The electrical barrier for the deterrence of fish according to claim 1 wherein the energy increasing field has a constant voltage source, a time varying current source, the time varying current source increasing from a minimum potential to a maximum potential; such that the product of the constant voltage source and the time varying current source will transfer increasing amounts of energy to the fish thereby evoking a flight response. The electrical barrier for the deterrence of fish having an energy increasing field having a time varying voltage source, the time varying voltage source increasing from a minimum potential to a maximum potential; a time varying current source, the time varying current source increasing from a minimum potential to a maximum potential; such that the product of the time varying voltage source and the time varying current source will transfer increasing amounts of energy to the fish thereby evoking a flight response.

The electrical barrier for the deterrence of fish having an energy increasing field having a time varying pulse-width modulated voltage source, the time varying pulse-width modulated voltage source increasing from a minimum potential to a maximum potential and having pulse widths that increase from a smaller width to a longer width; a time varying current source, the time varying current source increasing from a minimum potential to a maximum potential; such that the product of the time varying voltage source and the time varying current source will transfer increasing amounts of energy to the fish thereby evoking a flight response.

The electrical barrier for the deterrence of fish having a computer system capable of executing a modified soft-start algorithm, the computer system having a detector input and a switch output; a bio-electric fish proximity detector, the bio-electric fish proximity detector having a anode-cathode detecting pair input and a signal output, wherein said signal output is connected to the detector input; a time varying voltage source, the time varying current source increasing from a minimum potential to a maximum potential; a time varying current source, the time varying current source increasing from a minimum potential to a maximum potential; a controllable A-B switch having an A electrical path, a B electrical path, a common output, and a control input, such that the control input can select either the A electrical path or the 8 electrical path to be connected to the common output; the A electrical path electrically coupled to the signal output of the bio-electric fish proximity detector, the B electrical path electrically coupled to the electrode array; whereby the computer system sets the control input of the controllable A-B switch to the A electrical path to connect the bio-electric fish proximity detector signal out to the detector input; such that when the bio-electric fish proximity detector detects a fish, the computer system the computer system sets the control input of the controllable A-B switch to the B electrical path and initiates the modified soft-start algorithm. The electrical barrier for the deterrence of fish having an energy increasing field that further has a constant current source; a time varying voltage source, the time varying voltage source increasing from a minimum potential to a maximum potential; such that the product of the constant current source and the time varying voltage source will transfer increasing amounts of energy to the fish thereby evoking a flight response. The electrical barrier for the deterrence of fish having a time varying voltage source has a sine-like waveform.

The electrical barrier for the deterrence of fish having a time varying voltage source has a triangle-like waveform. The electrical barrier for the deterrence of fish having an energy increasing field further that has a constant voltage source; a time varying current source, the time varying current source increasing from a minimum potential to a maximum potential; such that the product of the constant voltage source and the time varying current source will transfer increasing amounts of energy to the fish thereby evoking a flight response.

The electrical barrier for the deterrence of fish with an energy increasing field further having a time varying voltage source, the time varying voltage source increasing from a minimum potential to a maximum potential; a time varying current source, the time varying current source increasing from a minimum potential to a maximum potential; such that the product of the time varying voltage source and the time varying current source will transfer increasing amounts of energy to the fish thereby evoking a flight response. The electrical barrier for the deterrence of fish having an energy increasing field having a time varying pulse-width modulated voltage source, the time varying pulse-width modulated voltage source increasing from a minimum potential to a maximum potential and having pulse widths that increase from a smaller width to a longer width; a time varying current source, the time varying current source increasing from a minimum potential to a maximum potential; such that the product of the time varying voltage source and the time varying current source will transfer increasing amounts of energy to the fish thereby evoking a flight response.

A method for the electric field controlled deterrence of fish monitoring the presence of fish proximate to an electrode array, activating a energy field with a minimal amount of output energy, increasing the energy field over time until a maximal amount of output energy is reached, so that fish exhibit a flight reaction away from the electrode array. The method for the field controlled deterrence of fish having the increasing energy field also setting the current at a constant value; increasing the voltage from a minimal value to a maximal value; such that the energy field is increased over time from a minimal value to a maximal value.

The method for the field controlled deterrence of fish whereby the increasing energy field further comprises setting the voltage at a constant value; increasing the current from a minimal value to a maximal value; such that the energy field is increased over time from a minimal value to a maximal value. The method for the field controlled deterrence of fish having the step of increasing energy field further varying the pulse width of the voltage from a minimal value to a maximum value; such that the energy field is increased over time from a minimal value to a maximal value. The method for the field controlled deterrence of fish whereby the increasing energy field further has the varying the pulse width of the voltage from a minimal value of 11 microseconds to a maximum value of 250 microseconds in 9 microsecond intervals over a 500 microsecond period; such that the energy field is increased over time from a minimal value to a maximal value. The method for the field controlled deterrence of fish whereby the increasing energy field further provides for the varying the waveform of the voltage from a group consisting of sine-like waveforms and triangle-like waveforms.

The foregoing is not intended to be an exhaustive list of embodiments and features of the present inventive subject matter. Persons skilled in the art are capable of appreciating other embodiments and features from the following detailed description in conjunction with the drawings.

LIST OF REFERENCE CHARACTERS

Figure 1:
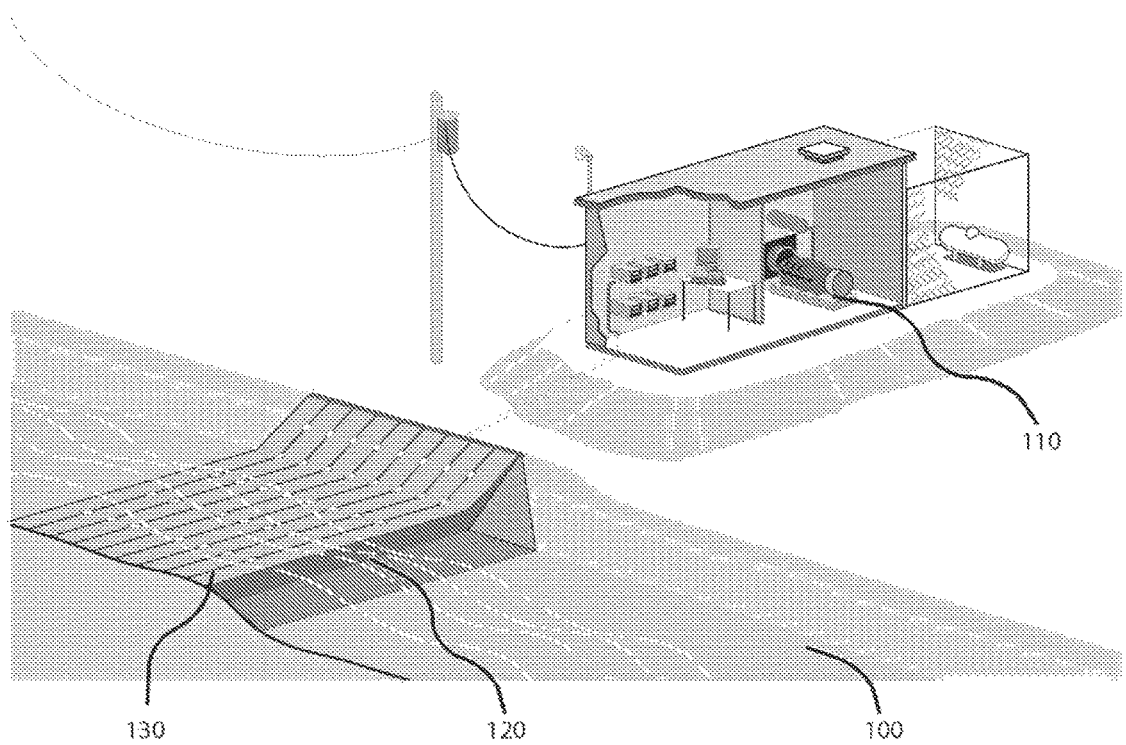
FIG. 1 is a prior art diagram of an electrified fish barrier depicting a pulsator unit, an electrode array, and a support structure for the electrode array.

100 Electrified Fish Barrier
110 Pulsator Unit
120 Support Structure
130 Electrode Array
210 Anode
220 Cathode
230 A representative water (or media) resistance
240 Representative fish resistance
300 Electric potential field
310 Representative field lines
320 Field line
510 Output voltage
520 Time Axis
530 Pulsed waveform
610 Output Voltage
620 Time Axis
630 Pulsed Waveforms
820 Time Axis
830 Pulsed Waveforms
900 General systems diagram
910 CPU
920 Wave Input
930 Power Output
940 Anode-Cathode pair
1000 Soft start Flowchart
1010 Program Initiation
1020 Detect Fish
1030 Begin Modified Soft start
1040 Activate Normal Soft start
1050 End
1100 System Diagram
1110 CPU
1120 Fish Proximity Detector
1130 Power Output
1140 A-B Switch
1150 Anode-Cathode Pair

DETAILED DESCRIPTION

Representative embodiments according to the inventive subject matter are shown in FIGS. 1-11, wherein similar features share common reference numerals.

Now referring to prior art FIG. 1 which illustrates the typical electrical barrier system. This system configuration is an electrified fish barrier 100 which has a pulsator unit 110, an electrode array support structure 120, and an electrode array 130. The pulsator unit 110 provides electrical output as either AC (alternating current) or DC (Direct Current) waveforms. These electrical waveforms may be either continuous or intermittent (e.g. pulsed). The electrical current is passed to the electrode array 130 which is affixed to the support structure 120. During operation, the fish (not shown) that are proximate to the electrode array 130 while the pulsator unit 110 is operating will be entrained or repulsed from the barrier.

Figure 2:
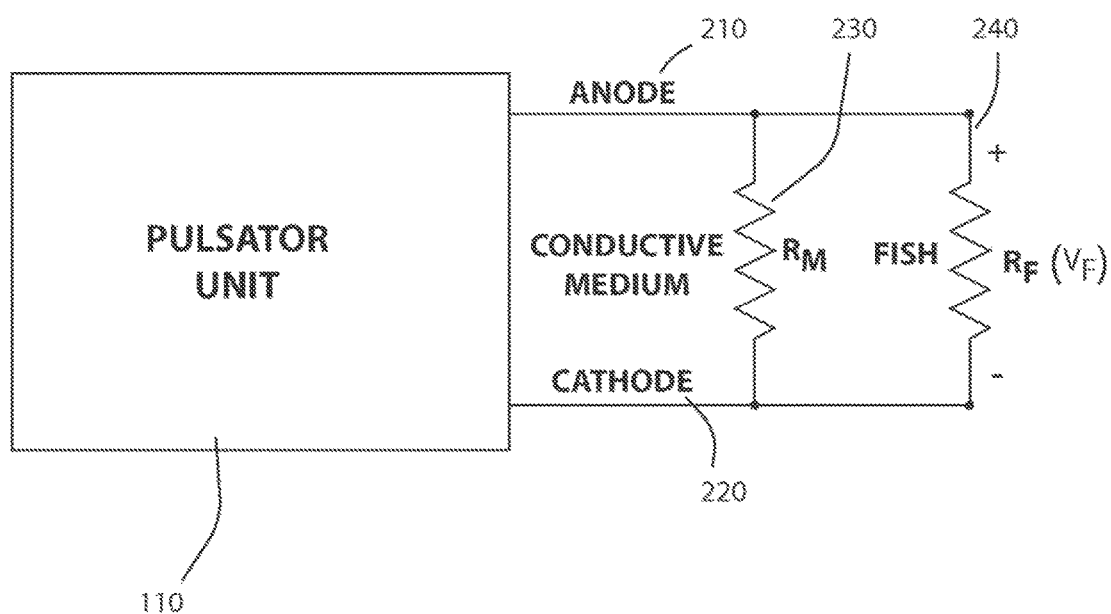
FIG. 2 is a prior art system diagram of an electrified fish barrier.

Now referring to prior art FIG. 2 that illustrates a schematic diagram of the pulsator unit 110, the anode 210, the cathode 220, a representative water (or other media) resistance 230, and representative fish resistance 240. As indicated, the pulsator unit 110 generates an electrical field that passes through the media and the fish. A portion of the electrical energy is dissipated by the water resistance 230 and a proportion of the electrical energy is dissipated by the current passing through the fish via the fishes inherent internal resistance 240.

As indicated, the anode 210 and cathode 220 may be configured as single leads or a multiplicity of leads. Whereas the electrical model of the fish in the diagram is somewhat simplified, it generally conforms to the analysis as provided by Kolz in the prior art patent, U.S. Pat. No. 5,289,133 (Feb. 22, 1994) entitled "Power Density Methods for Electroshocking" at columns 3 through 6.

It is the voltage potential created across the body of the fish due to the fish's internal resistance 240 which creates the reactive condition in the fish (flight reaction, narcosis, tetany, etc.). The range for this electrical field can vary from 0.1 volts per cm to 4.0 volts per cm depending on the type of evoked reaction and/or the species of the fish.

Figure 3:
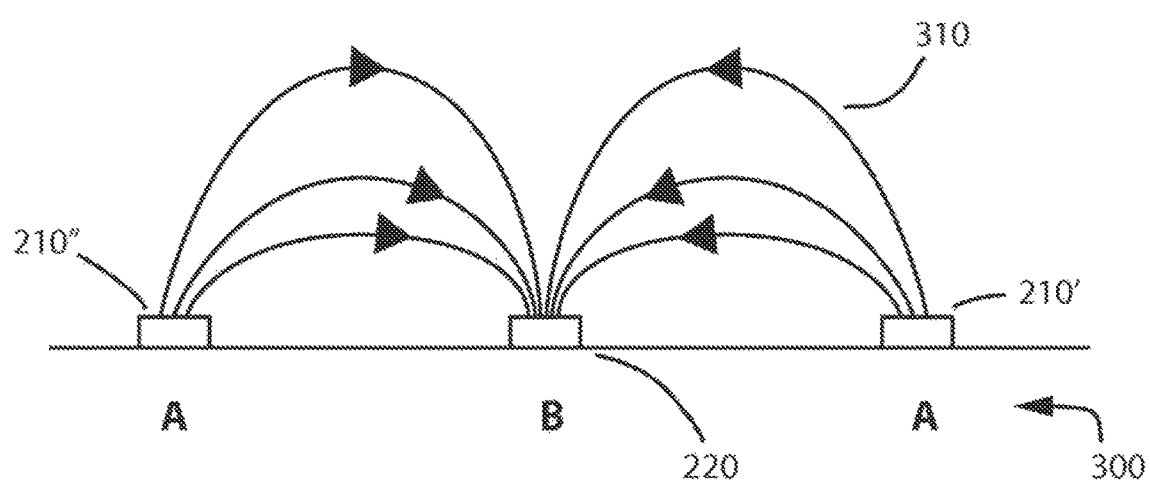
FIG. 3 is a diagram of an exemplary electrical field lines of an energized barrier between two anodes and a single cathode.
Figure 4:
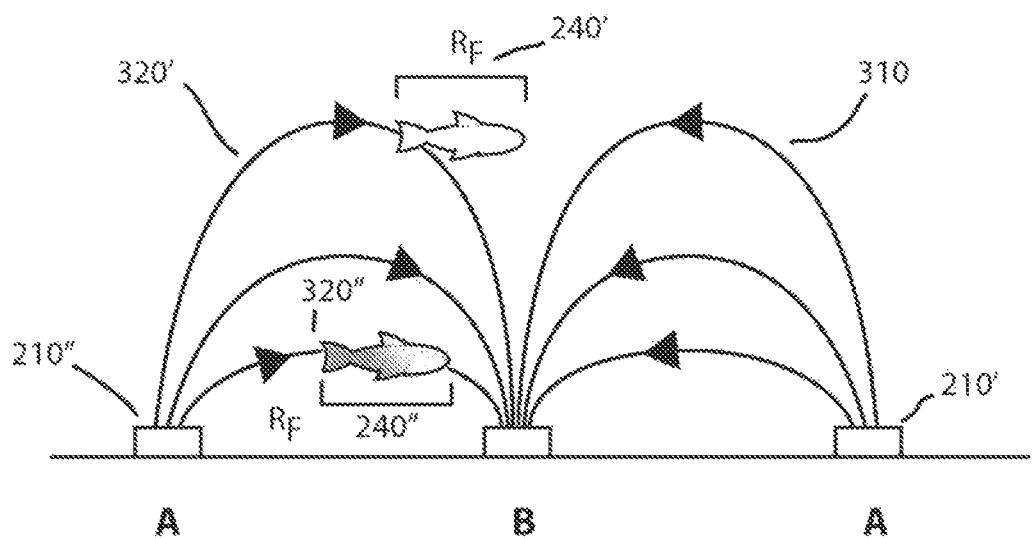
FIG. 4 is a diagram of the exemplary electrical field lines of an energized barrier with representative fish in different positions relative to the electrical barrier.

Now referring to prior art FIGS. 3 and 4 that show the electric potential field 300 and representative field lines 310 that passes between the anodes 210', 210" and the cathode 220. Typically, the field strength will be less the farther it extends from the anode and the cathode. As shown in FIG. 4 the representative field line 320' which passes through a fish resistance 240' will be greater for fish that are closer 240" to the field line 320" than those that are farther away 240' to the field line 320'.

Figure 5:
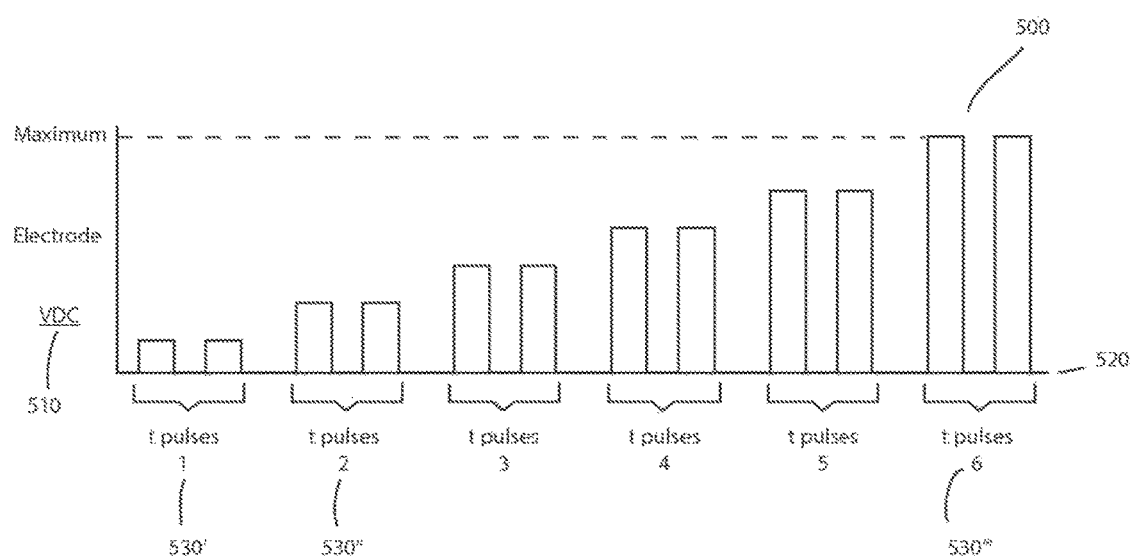
FIG. 5 is a diagram of representative electric pulses for the proposed "soft-start" electrical fish barrier where the barrier voltage pulses increase over time from a minimum amplitude to the maximum amplitude.

Now referring to FIG. 5 which shows a waveform 500 that depicts the voltage 510 which represents the potential difference between the anode and the cathode as depicted on they-axis. On the x-axis is a representative output for the pulsed waveform 530', 530", 530''' depicting the pulses as a function of time.

In one embodiment of the inventive subject matter, referred to as "soft start", the voltage 510 increases from a minimal value pulsed waveform 530' to a maximal value pulsed waveform 530'''. As a direct result of this increasing voltage, the field strength, as shown in the field lines 320 (see FIGS. 3 and 4), will also increase. The increasing field strength results in an increase in the electrical energy that is present in the field and that can be transferred to the fish. This increasing electrical field will then evoke a "flight reaction" in most fish that will result in their avoidance of the increasing field. Fish, and aquatic mammals, will then exhibit avoidance behavior of the area where the electrodes are energized, thus improving the effectiveness of the subject electrical barrier. Examples of this avoidance behavior is documented in the report entitled "Experimental Integrated Non-Lethal Sea Lion Abatement: Potential Behavioral and Stress Related Effects on Adult White Sturgeon", (Dec. 31, 2008), Ostrand, et. al, (BPA Project No. 2007-524-00).

Figure 6:
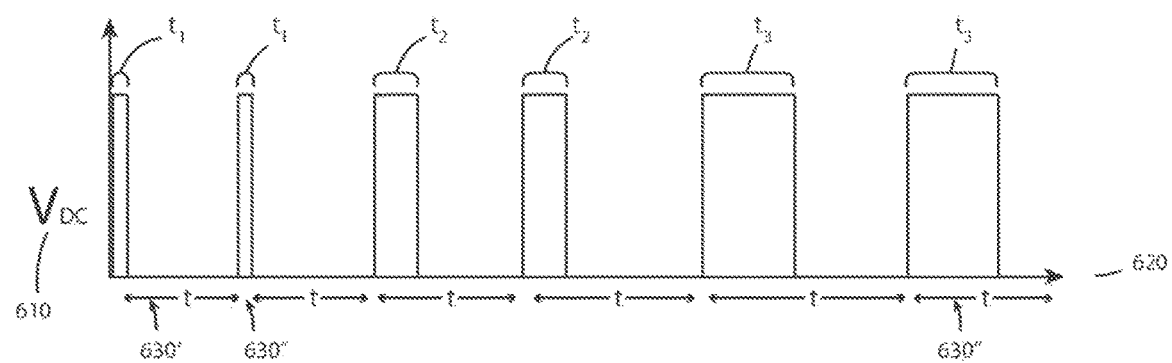
FIG. 6 is a diagram of representative square wave electric pulses for the soft-start electrical fish barrier where the pulse width is increased from a minimum width to a maximum width.

Now referring to FIG. 6, that depicts the electrode voltage 610 on the yaxis and the variation of that voltage on the x-axis 620 as a function of time. In this embodiment, the pulse width is increased as a function of time as shown by the electrical pulse widths 630', 630", and 630". Electrical pulses having smaller widths (i.e. 630') will transfer less energy (and hence evoke a smaller reaction) to the fish in the potential field. Electrical pulses having wider widths (i.e. 630") will impress a potential difference on the fish for a longer duration. The physiological response of the fish to the electric field is dependent on the potential difference and the width of the field and the dimensions of the fish.

Figure 7A:
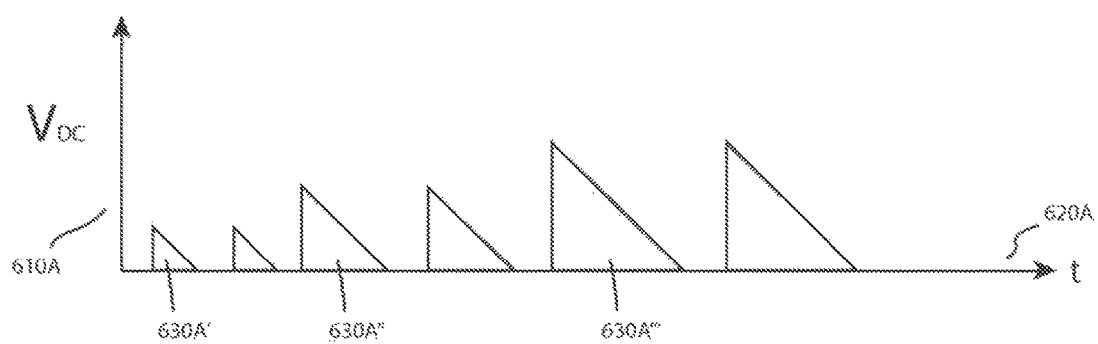
FIGS. 7A and 7B are diagrams of representative electric pulses having triangle waveforms (FIG. 7A) and partial sine waveforms (FIG. 7B).
Figure 7B:
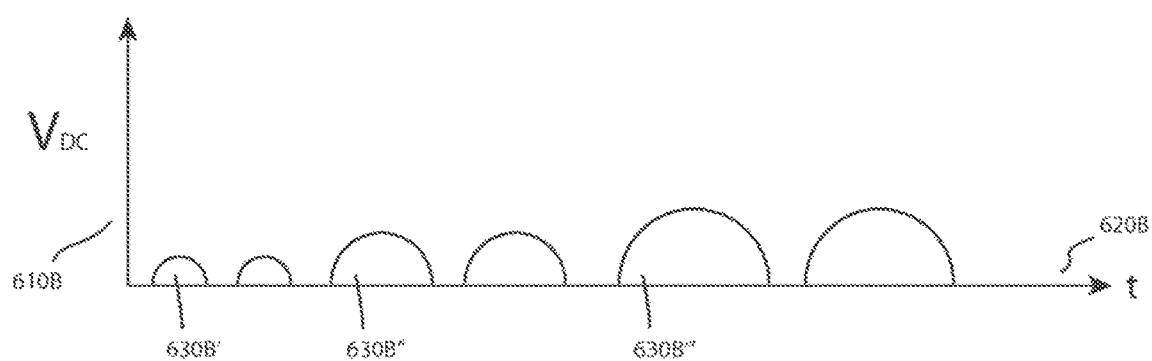

Other variations include modification of the electrical pulse height as illustrated FIG. 7 that incorporate waveforms as shown in FIG. 5 and in addition to the width as shown in FIG. 6. Other variations of the electric field potential are shown in FIGS. 7A and 7B. The voltage potential 610A, 610B is plotted as a function of time 620A, 620B. The peak voltage for each pulse starts at a minimum voltage potential 630A', 630B' and increases over time to a maximum potential 630A", 630B". This increase in voltage potential is similar to the increase in voltage potential as shown in FIGS. 7A and 7B.

Figure 8A:
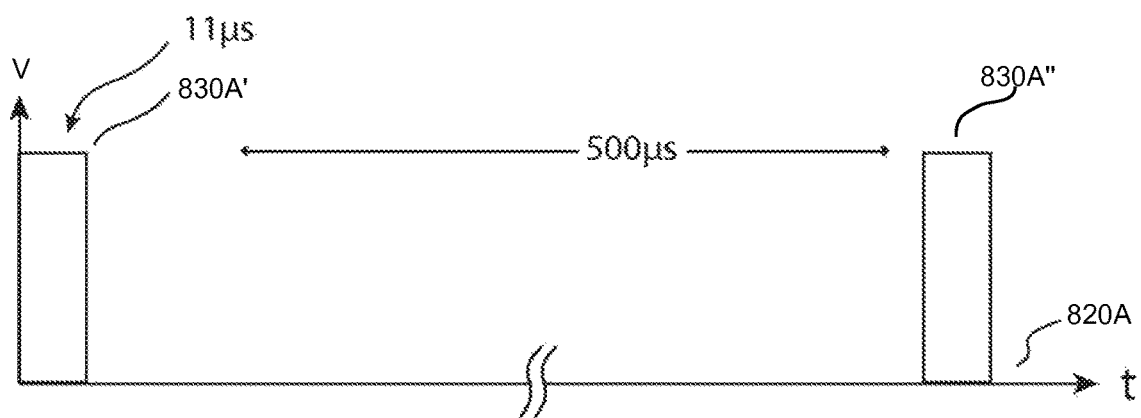
FIGS. 8A, 8B and 8C are diagrams of representative square wave electric pulses for the soft-start electrical fish barrier. Where the first pulse is 11 microseconds (FIG. 8A), 20 microseconds (FIG. 8B) and 29 microseconds (FIG. 8C) followed by a 479 microsecond to the next pulse.
Figure 8B:
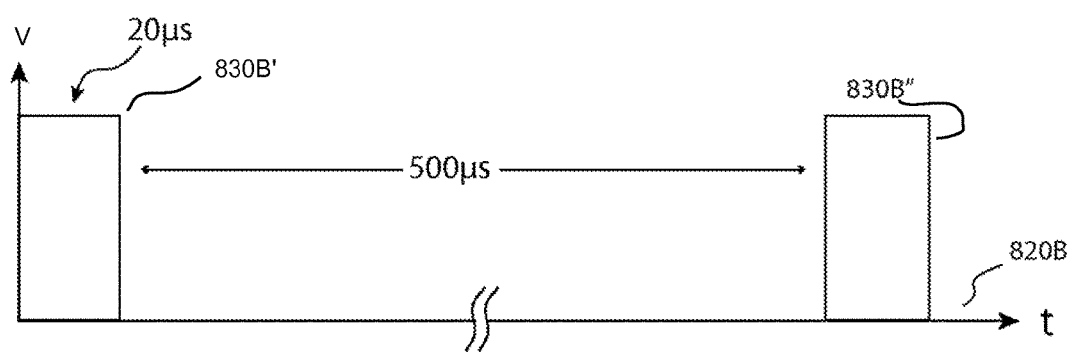
Figure 8C:
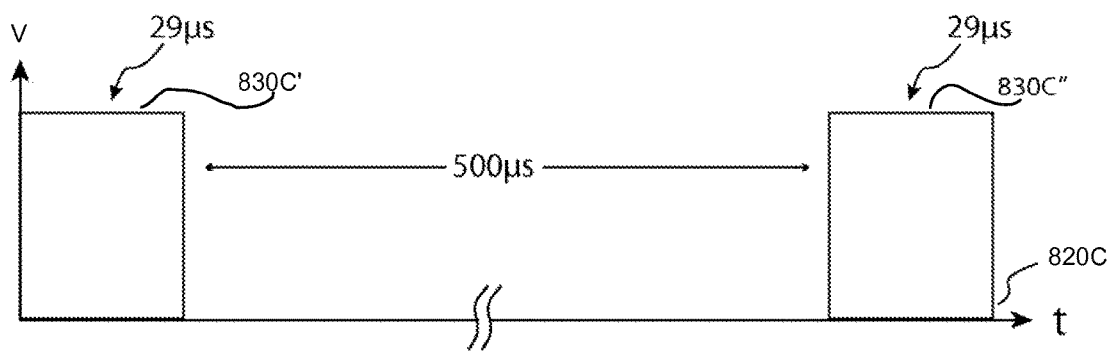

Now referring to FIGS. 8A, 8B and 8C which shows one detailed embodiment of the waveform as depicted in FIG. 6. In this embodiment, as in FIG. 8A the first pulse 830A' is approximately 11 microseconds followed by a 479 microseconds gap to the next pulse 830A". This waveform has an approximately 2.2% duty cycle. As in FIG. 8B when the pulse 830B' is then increased by 9 microseconds to 20 microseconds which provides a 4% duty cycle. As in FIG. 8C when the next pulse 830C' is increased to 29 microseconds which increases the duty cycle to 5.8%. The rate of that the duty cycle can be increased will depend on the type of fish that are proximate to the barrier. The waveform is also commonly known as "pulse width modulation".

Figure 9:
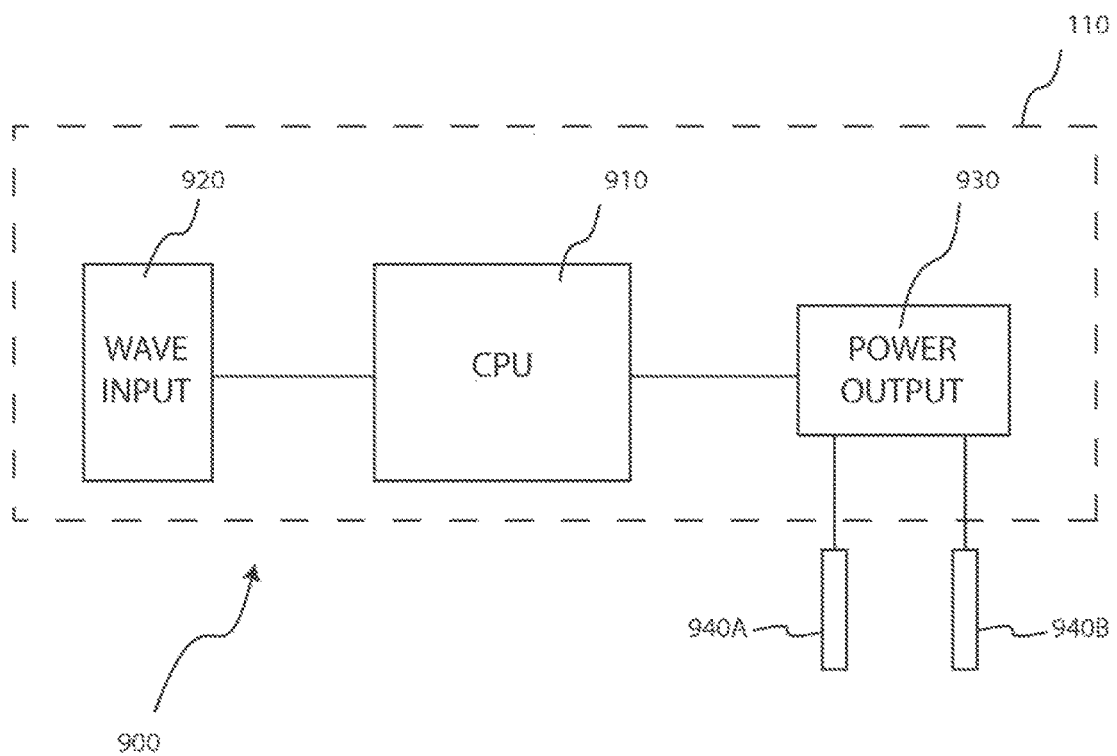
FIG. 9 is a systems diagram of the soft start pulsing waveform.

Now referring to FIG. 9 which shows a general systems diagram 900 of the subcomponents in the pulsator 110. The pulsator 110 contains a CPU or central processing unit 910, library of waveform inputs 920 that are accessible to the central processing unit 910, a power output unit 930, and the power output unit 930 connected to an anode-cathode pair 940A, 940B. During the initiation of "soft start", the CPU 910 will access the library of waveform inputs 920 which programmatically provide the parameters to the power output subsystem 930.

The power output subsystem 930 creates the time-varying potential difference on the anode/cathode pair 940A/940B.

Figure 10:
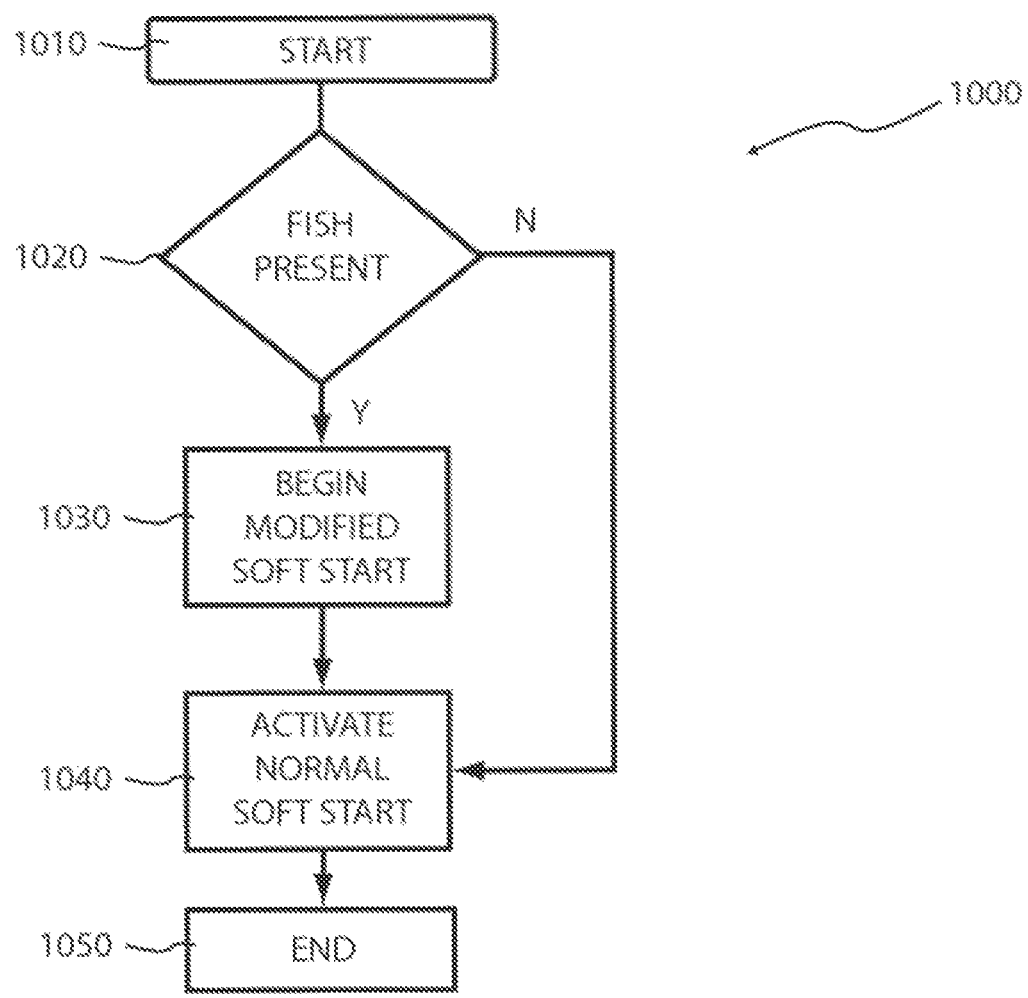
FIG. 10 is a flow-chart of the soft start system.

The algorithm 1000 for implementing the "soft start" electrical field, as shown in varying embodiments in FIGS. 5 through 8 and as implemented in the CPU 910 of FIG. 9 is shown in FIG. 10. The implementation of algorithm 1000 is not linked to a particular programming language and may be implemented in any programming language, such as, "C", "Perl", or "Python".

When the electrical barriers are initiated 1010, a test for fish located proximate to the electrodes is performed 1020. If fish are detected very close to the electrodes and/or lying on a particular electrode then the soft start procedure is modified 1030 to account for fish that are proximate to the electrodes. This modified soft start procedure 1030 has lower voltages and/or cycle widths as previously shown in FIGS. 5-7. If fish are not detected in the area proximate to the electrodes, then a normal "soft start" procedure 1040 is initiated.

Figure 11:
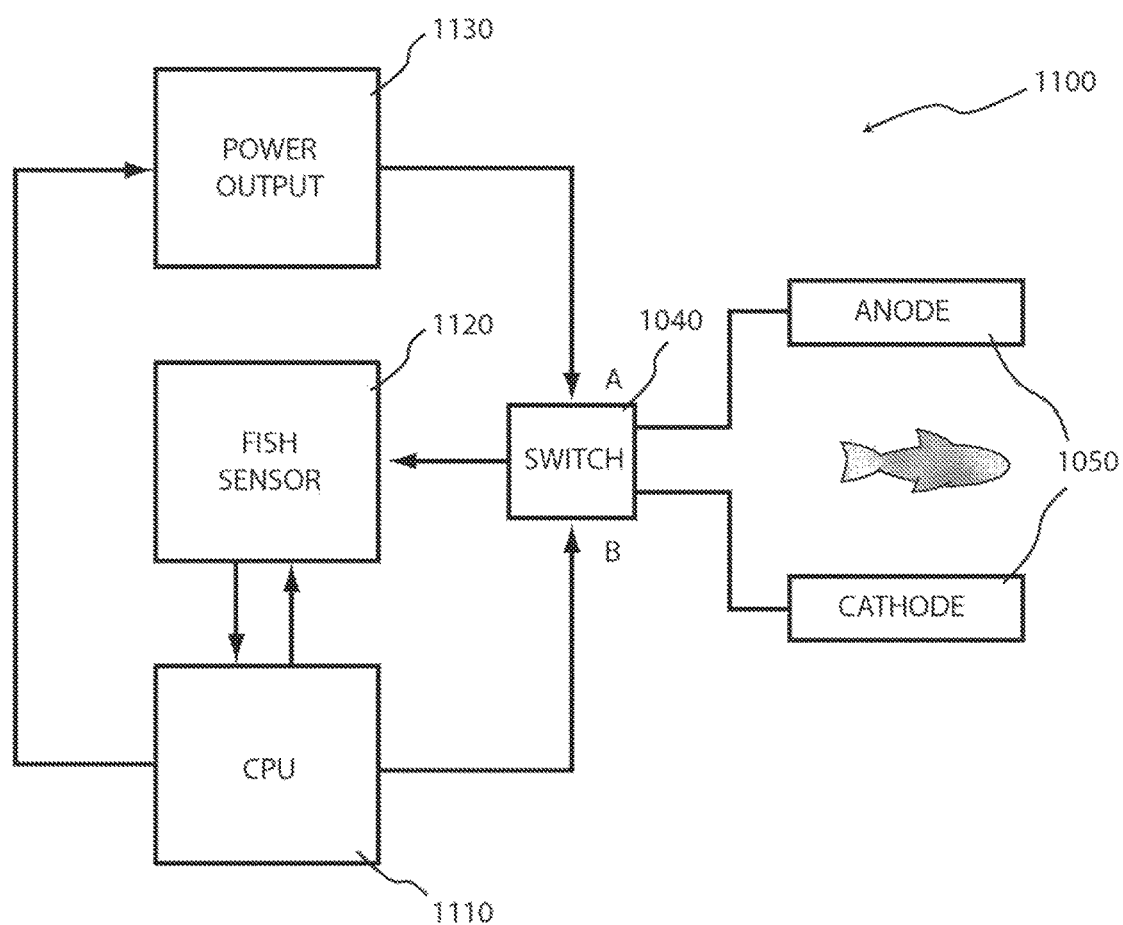
FIG. 11 is a system diagram of the soft start system with fish activity feedback.

Now referring to FIG. 11 which depicts a system 1100 that incorporates the detection of fish that are closely proximate to the electrodes. This system has a CPU 1110, a fish proximity sensor module 1120, a power output module 1130, A-B switch 1140, and an anode-cathode pair 1150. In this embodiment, the A-B switch 1140 is configured to allow electrical signals to be detected between the anode-cathode pair 1150 by the fish proximity sensor module 1120. The fish proximity detector 1120 amplifies bio-electric signals generated by fish that are generated in the vicinity of the anode-cathode pair. Signal processing algorithms in the fish proximity detector 1120 generate a signal if there is a reasonable probability that fish are present. If the fish are present, then the A-B switch is placed in the "A" position, and the CPU is set to initiate a "modified soft start" 1030 as described in FIG. 10. At the end of the modified soft start procedure, a normal soft-start procedure may be initiated, leading to a normal operation.

Alternately, the A-B switch may be toggled between the power output 1130 generating the "modified soft start" 1030 and the fish proximity detector 1120 in such a way that fish that are proximate are "cleared away" using low energy impulses prior to the initiation of high energy impulses.

It is understood that the algorithms described herein may be implemented in software as a computer program or alternately in firmware. The inventive subject matter is not limited to one specific implementation.

It is understood that the aforementioned deterrence system can work independently or can work with other deterrence systems, such as sound, visual, and/or other mechanical based methods of deterrence.

Persons skilled in the art will recognize that many modifications and variations are possible in the details, materials, and arrangements of the parts and actions which have been described and illustrated in order to explain the nature of this inventive concept and that such modifications and variations do not depart from the spirit and scope of the teachings and claims contained therein.

All patent and non-patent literature cited herein is hereby incorporated by references in its entirety for all purposes.

The invention claimed is:

1. A method for an electric field controlled deterrence of fish comprising:
    operating an electrical switch in a first electrical path;
    monitoring a presence of a fish proximate to an electrode array by a fish proximity detector;
    amplifying a signal generated by the fish proximity detector based on a detection of fish, proximate to the electrode array;
    switching the operation of the electrical switch in a second path;
    activating an electrical energy field with a minimal amount of output energy,
    increasing the electrical energy field over time until a maximal amount of output energy is reached,
    such that the fish will exhibit a flight reaction away from the electrode array in response to the electrical energy field; and
    toggling the operation of the electrical switch between the first path and the second path, so that fish proximate to the electrode array are cleared away using low energy impulses prior to an initiation of high energy impulses.

2. The method of claim 1 for an electric field controlled deterrence of fish whereby
    the increasing energy field further comprises:
        setting a current at a constant value;
        increasing a voltage from a minimal value to a maximal value;
        such that the energy field is increased over time from a minimal value to a maximal value.

3. The method of claim 1 for an electric field controlled deterrence of fish whereby
    the increasing energy field further comprises:
        varying a pulse width of a voltage from a minimal value to a maximum value;
        such that the energy field is increased over time from a minimal value to a maximal value.

4. The method of claim 1 for an electric field controlled deterrence of fish whereby
    the increasing energy field further comprises:
        varying a pulse width of a voltage from a minimal value of 11 microseconds to a maximum value of 250 microseconds in 9 microsecond intervals over a 500-microsecond period;
        such that the energy field is increased over time from a minimal value to a maximal value.

5. The method of claim 1 for an electric field controlled deterrence of fish whereby
    the increasing energy field further comprises:
        varying a waveform of a voltage from a group consisting of sine-like waveforms and triangle-like waveforms.

6. The method of claim 1, wherein the signal generated by a fish proximity detector is a bio-electric signal.

7. The method of claim 1, further generating the signal, only when there is probability of detecting a fish.

* * * * *